United States Patent [19]

Werner et al.

[11] Patent Number: 4,900,397

[45] Date of Patent: Feb. 13, 1990

[54] PRODUCTION OF MAGNETIC RECORDING MEDIA

[75] Inventors: Arend Werner, Bad Durkheim; Hartmut Hibst, Ludwigshafen; Erich Haedicke, Hirschberg; Johann Kronenbitter, Heidelberg, all of Fed. Rep. of Germany

[73] Assignee: BASF Aktiengesellschaft, Ludwigshafen, Fed. Rep. of Germany

[21] Appl. No.: 228,724

[22] Filed: Aug. 5, 1988

[30] Foreign Application Priority Data

Aug. 8, 1987 [DE] Fed. Rep. of Germany ....... 3726464

[51] Int. Cl.⁴ ............................ C23F 1/00; B44C 1/22; C03C 15/00; C03C 25/06
[52] U.S. Cl. .................................... 156/643; 156/646; 156/656; 156/664; 204/192.2; 204/192.32; 134/1; 427/131; 427/132; 428/611; 428/928; 360/135
[58] Field of Search ............... 156/643, 646, 656, 664, 156/665; 134/1; 427/128, 129, 131, 132; 428/611, 652, 667, 680, 900, 928; 360/134, 135; 204/192.1, 192.2, 192.32

[56] References Cited

U.S. PATENT DOCUMENTS

| | | | |
|---|---|---|---|
| 4,552,820 | 11/1985 | Lin et al. | 428/611 |
| 4,629,660 | 12/1986 | Sagoi et al. | 428/678 |
| 4,659,605 | 4/1987 | Malik et al. | 427/129 |
| 4,698,251 | 10/1987 | Fukuda et al. | 428/64 |
| 4,786,564 | 11/1988 | Chen et al. | 204/192.2 X |

FOREIGN PATENT DOCUMENTS

| | | |
|---|---|---|
| 0145157 | 6/1985 | European Pat. Off. . |
| 0183120 | 6/1986 | European Pat. Off. . |
| 0205239 | 12/1986 | European Pat. Off. . |

*Primary Examiner*—William A. Powell
*Attorney, Agent, or Firm*—Keil & Weinkauf

[57] ABSTRACT

Magnetic recording media essentially consisting of a disk-shaped aluminum substrate, a nonmagnetic (Ni-P) lower film, a chromium-containing intermediate film and a ferromagnetic metal film are produced by a process in which the surface of the (Ni-P) lower film is cleaned by RF sputter etching and then oxidized.

9 Claims, No Drawings

PRODUCTION OF MAGNETIC RECORDING MEDIA

The present invention relates to a process for the production of magnetic recording media essentially consisting of a disk-shaped aluminum substrate bearing a lower nonmagnetic (Ni-P) film, an intermediate chromium-containing film and an upper ferromagnetic metal film, having improved adhesion between the substrate and the magnetic film in combination with excellent magnetic properties.

Magnetic recording media now usually consist of a substrate which is coated with a dispersion essentially consisting of an organic binder and magnetic particles. In the case of magnetic disks, coating is effected by spin-coating. The further development of electronic data processing requires recording media of increasing storage density. These requirements can only be med to a limited extent by the pigmented magnetic films.

Because of their physical properties, thin coherent films of magnetic material, preferably metal alloys, are possible storage media having substantially increased storage density. These films are preferably produced by chemical deposition (plating) or by PVD methods, such as cathode sputtering and vapor deposition. The said films may be single films, as in the case of Co-P (plating) or $\gamma\text{-}Fe_2O_3$ and Co-Pt (sputtering). However, other conventional systems are multi-film systems, which consist, for example, of a nonmagnetic lower film (Bi, Cr, etc.) and the magnetic film applied thereon (usually Co alloys, such as Co-Ni, Co-Cr, Co-Ni-Cr, etc.). It is known that these multi-film systems are produced by a sputter process (EP-A-O 205 239, EP-A-0 183 120 and EP-A- 0145 157). In order to improve the stability to corrosion and the frictional properties of these films, the magnetic films are usually provided with a protective film. Typical of these is the carbon film applied by sputtering. Typical film thicknesses are from 100 to 400 nm for the lower film, from 30 to 100 nm for the magnetic film and from 20 to 100 nm for the protective film.

In the known disk-shaped recording media which have a ferromagnetic metal film as the magnetic film, the substrates generally consist of aluminum or aluminum alloys. For the production of these thin-film magnetic disks, in a first step aluminum substrates are coated by a chemical method with a hard nonmagnetic amorphous (Ni-P) lower film which is about 20 μm thick and has a P content of from 15 to 20 atom %; small substrate defects can be corrected. The great hardness of the lower film improves the tribological properties of the magnetic disk and makes it possible, in a subsequent surface treatment step, to obtain a defined surface roughness which is necessary for reproducible flight behavior of the head and prevents sticking of the head to the magnetic disk. After polishing or after texturizing, the surface of the (Ni-P) film is subjected to a number of chemical and mechanical cleaning steps in order to remove abraded material and residues of the abrasive. Particularly in the case of the texturized substrates, however, small traces of surface deposits remain, leading to poor adhesion between the intermediate chromium film applied by sputtering and the AL/(Ni-P) substrate and thus resulting in an undesirably high rejection rate owing to defects.

It is also known that the adhesion of films can be improved by the sputter etching technique. In this procedure, the substrate is made the cathode and the surface cost is then applied without the substrate itself being etched. In order to be certain of removing oxide coats too, it is necessary to use the RF sputter technique.

U.S. Pat. No. 4 552 820 describes a magnetic recording medium which comprises a film system which has been applied by sputtering and consists of a Cr lower film, a (Co-Cr) magnetic film and a C protective film. The substrate used is a AL disk having a (Ni-V) film applied by sputtering. The application of (Ni-V) films by sputtering gives a clean surface, ensuring good adhesion to the film system without additional cleaning being necessary. It is also stated that the additional oxidation of the surface of the (Ni-V) film reduces the modulation of the relative remanence along a recording track. The long time required to apply an (Ni-V) film several μm thick by sputtering and the resulting high production costs are disadvantageous. Another disadvantage is the fact that the (Ni-V) surface cannot be texturized in this process since texturing would destroy the clean surface applied by sputtering. However, this causes sticking of the head.

It is an object of the present invention to provide a process for the production of magnetic recording media which essentially consist of a disk-shaped aluminum substrate bearing a lower nonmagnetic (Ni-P) film, an intermediate chromium-containing film and an upper ferromagnetic metal film, in which the adhesion of the films to the substrate is improved while at the same time excellent magnetic properties are obtained.

We have found that this object is achieved if, in the production of the magnetic recording media defined at the outset, the surface of the lower (Ni-P) film is cleaned by RF sputter etching, then oxidized and provided subsequently with the chromium-containing intermediate film and finally with the ferromagnetic metal film.

In the novel process, the aluminum substrates provided in a conventional manner with a nonmagnetic lower amorphous (Ni-P) film are cleaned on the surface by RF sputter etching. For the purposes of the present invention, cleaning means that from 1 to 20, preferably from 3 to 10, nm of material are removed from the (Ni-P) film surface, ie. surface impurities as well as film material itself are removed. This newly formed surface zone is then oxidized with an oxygen-containing gas mixture. This can be effected by removing the substrate with the sputter-etched surface from the apparatus and storing it for from 10 seconds to 12 hours, preferably for a short period of from 60 to 300 s, in the air or in an oxygen-containing gas mixture.

After the preparation of the lower (Ni-P) film surface, a chromium-containing intermediate film is applied thereon. This is done, for example, by applying chromium under an argon pressure of from $5\cdot10^{-4}$ to $5\cdot10^{-2}$ mbar by sputtering in the DC magnetron mode.

Instead of a chromium-containing intermediate film, it is just as suitable to use the elements bismuth, gold, molybdenum, tantalum or tungsten or alloys of these materials for the production of these intermediate films.

After the application of the intermediate film, the ferromagnetic film is produced and, if required, a protective film is applied on top of this. Both the metal film and the protective film are usually produced by sputtering in the DC magnetron mode.

In another advantageous embodiment of this novel process step of surface oxidation of the (Ni-P) film surface, RF sputter etching of the (Ni-P) surface is carried out in a mixture of argon and oxygen as sputter gas. The oxygen ions produced in the plasma are accerlated toward the substrate and thus oxidize the (Ni-P) surface freshly applied by sputtering. An oxygen content of from 5 to 90, in particular from 20 to 50, % by volume, based on argon, has proven advantageous. In the procedure for the oxidation carried out in this manner, it is advisable to change the oxygen content continuously during sputter etching, in such a way that pure argon is present at the beginning of sputtering and the oxygen content is from 5 to 100, preferably from 20 to 100, % by volume at the end of the etching process.

In another advantageous embodiment of the novel process, the (Ni-P) surface cleaned by sputter etching is not exclusively oxidized prior to coating with chromium; instead, oxygen is added to the argon sputter gas during the production of the chromiun-containing intermediate film, at the beginning of the growth of this film. This reactive sputtering results in the formation of an oxygen-containing chromium intermediate film, referred to below as the intermediate (Cr-O) film, which prevents the occurrence of the (110) texture in the subsequently applied pure chromium intermediate film, provided that the intermediate (Cr-O) film is not less than 3 nm thick and the oxygen content is from 6 to 60 atom %. Furthermore, the thickness of the intermediate (Cr-O) film must not exceed 95% of the total thickness of the chromium-containing intermediate films. The subsequent application of the ferromagnetic metal film and, where relevant, a protective film is carried out in a known manner.

The novel process makes it possible to produce magnetic recording media of the rigid thin-film magnetic disk type, which, compared with the prior art, have improved adhesion between substrate and magnetic film but nevertheless have very good magnetic properties, in particular the required high coercive forces. This constitutes a substantial improvement over the conventional procedure, in which only the surface deposit is removed more or less thoroughly from the substrates by heating the (Ni-P) surface under reduced pressure or by sputter etching, with the result that optimum adhesion of the subsequently applied chromium intermediate film is still not ensured. Although thorough cleaning by RF sputter etching, in which as well as the surface deposit the material of the surface itself is removed, is in itself sufficient to ensure good adhesion of the chromium intermediate film to the (Ni-P) surface, it simultaneously results in a substantial reduction in the coercive force compared with samples having unetched substrates. With the aid of X-ray texture analysis, it has been possible to show that the chromium intermediate films applied by sputtering to oxygen-free or low-oxygen (Ni-P) surfaces have a disadvantageous, pronounced (110) texture instead of the desired isotropic alignment of the crystallites, with the result that, owing to the crystallographic coupling between the chromium intermediate film and the magnetic film applied by sputtering, the (110) texture of the lower film produces a magnetic film texture which is responsible for the decrease in the coercive force.

The Examples which follow illustrate the invention and compare it with experiments based on the known procedure. The coercive force $H_c$, in [kA/m], measured on the magnetic films was determined using a vibrating sample magnetometer, and the adhesion was investigated by the adhesive tape test.

COMPARATIVE EXPERIMENT 1

Mechanically and chemically cleaned AL/(Ni-P) substrates were provided with a 200 nm thick chromium intermediate film and a 100 nm thick $Co_{80}Ni_{20}$ magnetic film. The coating was carried out statically in the DC magnetron mode under an Ar pressure of $5\times10^{-3}$ mbar at sputter rates of 100 nm/min for Cr and 70 nm/min for $Co_{80}Ni_{20}$. The basic pressure was better than $10^{-7}$ mbar and the targets used were materials melted under reduced pressure. Without cleaning by sputter etching, $H_c$ values of 30 kA/m were obtained. The films exhibited poor adhesion. The X-ray investigation of the chromium intermediate film showed no preferred crystallographic alignment.

COMPARATIVE EXPERIMENT 2

Mechanically and chemically cleaned AL/(Ni-P) substrates were subjected to RF sputter etching. The etching time was 5 minutes and the etching rate 3 nm/min. The 200 nm thick chromium intermediate film applied by sputtering as described in Comparative Experiment 1 showed a pronounced (110) texturing of the crystallites. The $H_c$ of the 100 nm thick $Co_{80}Ni_{20}$ film applied by sputtering as described in Comparative Experiment 1 was only 20 kA/m. The films showed good adhesion.

EXAMPLE 1

As described in Comparative Experiment 2, AL/(Ni-P) substrates were cleaned by sputter etching. Thereafter, however, the etched substrate was removed for 60 sec and exposed to the air. The subsequently applied chromium film showed no X-ray texture, and the $Co_{80}Ni_{20}$ film had an $H_c$ value of 30 kA/m. The films showed good adshesion.

EXAMPLE 2

Film production and pretreatment of the substrate were carried out as described in Example 1, except that, instead of a 100 nm thick $Co_{80}Ni_{20}$ film, a film only 50 nm thick was applied. Cleaning of the (Ni-P) surface by RF sputter etching and subsequent oxidation as described in Example 1 gave an $H_c$ value of 53 kA/m. In comparison, with sputter etching along and without subsequent oxidation of the (Ni-P) surface, the $H_c$ value determined was only 25 kA/m. The films showed good adhesion.

EXAMPLE 3

Film production was carried out as described in Example 1, except that, instead of a 100 nm thick $Co_{80}Ni_{20}$ film, an 80 nm thick $Co_{62.5}Ni_{30}Cr_{7.5}$ film was applied. Cleaning of the (Ni-P) surface by RF sputter etching and subsequent oxidation as described in Example 1 gave an $H_c$ value of 62 kA/m. In comparison, with sputter etching alone and without subsequent oxidation of the cleaned (Ni-P) surface, the $H_c$ value determined was only 38 kA/m. The films showed good adhesion.

EXAMPLE 4

The AL/(Ni-P) substrate was subjected to RF sputter etching for 5 minutes (etching rate 3 nm/min). At the beginning of coating with Cr, an $O_2$ partial pressure of $5\times10^{-5}$ mbar was established for 60 sec so that the lower film consisted of 100 nm of Cr-0 (8 atom % of O) and 100 nm of Cr. The resulting $H_c$ value of a 100 nm thick $Co_{80}Ni_{20}$ film was 30 kA/m. The films showed good adhesion.

We claim:

1. A process for the production of a magnetic recording medium consisting essentially of a disk-shaped aluminum substrate bearing a lower non-magnetic (Ni-P) film, a chromium film and an upper ferromagnetic metal film, which comprises:
    (1) removing material from the surface of the (Ni-P) film, by RF sputter etching to a depth of from 1 to 20 nm,
    (2) oxidizing the etched (Ni-P) surface with an oxygen-containing gas for from 10 seconds to 12 hours, and
    (3) thereafter depositing the chromium film and the ferromagnetic metal film in succession on the (Ni-P) film.

2. The process of claim 1, wherein oxidation is effected with a mixture of argon and oxygen, the oxygen content being from 5 to 90% by volume, based on argon.

3. The process of claim 1, wherein oxidation is effected with air.

4. A process for the production of a magnetic recording medium consisting essentially of a disk-shaped aluminum substrate bearing a lower non-magnetic (Ni-P) film, a chromium film and an upper ferromagnetic metal film, which comprises:
    (1) RF sputter etching the surface of the (Ni-P) film in a miture of argon and oxygen as sputter gas, and
    (2) thereafter depositing the chromium film and the ferromagnetic metal film in succession on the (Ni-P) film.

5. The process of claim 4, wherein the sputter gas for the RF sputter etching is pure argon at the beginning of the etching, and the oxygen content of the sputter gas is from 5 to 100% by volume at the end of the etching process.

6. A process for the production of a magnetic rcording medium consisting essentially of a disk-shaped aluminum substrate bearing a lower nonmagnetic (Ni-P) film, a chromium film and an upper ferromagnetic metal film, which comprises:
    (1) removing material from the surface of the (Ni-P) film,
    (2) applying an intermediate oxygen-containing chromium film to the (Ni-P) film by reactive sputtering of chromium in a mixture of argon and oxygen as sputter gas, and
    (3) thereafter depositing the chromium film and the ferromagnetic metal film in succession on the (Ni-P) film.

7. The process of claim 6, wherein the thickness of the intermediate oxygen-containing chromium film is not less than 3 nm and not more than 95% of the total thickness of the oxygen-containing chromium film and the chromium film.

8. The process of claim 6, wherein the oxygen concentration in the oxygen-containing chromium film is from 6 to 60 atom %.

9. The process of claim 6, wherein, in the region of transition from the oxygen-containing chromium film to the chromium film, the oxygen content changes continuously.

* * * * *